United States Patent [19]

Benner, Jr. et al.

[11] 3,822,008
[45] July 2, 1974

[54] TRANSFER APPARATUS FOR PACKAGING MACHINE

[75] Inventors: Harold T. Benner, Jr.; Charles E. Cloud, both of Wilmette, Ill.

[73] Assignee: R. A. Jones & Co. Inc., Covington, Ky.

[22] Filed: Feb. 1, 1973

[21] Appl. No.: 328,512

[52] U.S. Cl................... 198/35, 198/25, 198/210, 214/6 FS, 271/96, 271/108
[51] Int. Cl...................... B65g 57/04, B65g 57/32
[58] Field of Search........ 198/35, 210, 25; 271/108, 271/96, 94, 74, 64; 214/6 FS

[56] References Cited
UNITED STATES PATENTS
3,683,730  8/1972  Driessen .............................. 271/64
3,684,279  8/1972  Heimlicher .......................... 271/64

*Primary Examiner*—Richard E. Aegerter
*Assistant Examiner*—Jeffrey V. Nase
*Attorney, Agent, or Firm*—Wood, Herron & Evans

[57] ABSTRACT

A packaging machine for packaging a group of packets into a carton has an incoming conveyor adapted to transport the packets in single file fashion, and a transfer wheel is juxtaposed with the end of the incoming conveyor to receive the packets and transfer them to an outgoing conveyor travelling at a slower velocity than the incoming conveyor. The outgoing conveyor carries a series of compartments, and a plurality of packets are deposited into each of the compartments in stacked relationship.

20 Claims, 12 Drawing Figures

PATENTED JUL 2 1974

TRANSFER APPARATUS FOR PACKAGING MACHINE

BACKGROUND OF THE INVENTION

1. Field of the Invention

The present invention relates to transfer apparatus for a packaging machine, and more particularly to such apparatus for effecting the transfer of an incoming stream of packets to a series of outgoing piles of such packets.

2. The Prior Art

Machines for forming pouches from web material, and filling the pouches to produce filled packets, are well known. For example, such a machine is disclosed in Cloud U.S. Pat. No. 3,344,576. It is desirable to package a number of such packets in a single carton or box and to that end it is desirable to collect a plurality of packets together in a stack or pile so that they can be transferred together into the carton. In the prior art, this has been accomplished manually, by a process which requires an operator to remove packets moving in a serial stream on a conveyor, and form them into piles or stacks, preparatory to being inserted into a carton. It is desirable to provide more efficient means of accomplishing this procedure.

SUMMARY OF THE INVENTION

It is a principal object of the present invention to provide automatic means for transferring packets from a serial stream to a plurality of compartments supported on an outgoing conveyor.

Another object of the present invention is to provide automatic transfer means for efficiently and automatically transferring pouches from a relatively rapidly moving conveyor to a conveyor which moves more slowly.

A further object of the present invention is to provide an automatic transfer means adapted to receive pouches at a single inlet point from an incoming conveyor, and to release pouches to an outgoing conveyor at a series of release points overlying a compartment of the outgoing conveyor as it moves.

These and other objects and advantages of the present invention will become manifest upon an inspection of the following description and the accompanying drawings.

In one embodiment of the present invention there is provided a rotatable transfer wheel aligned with an incoming conveyor, a plurality of gripper members mounted on the wheel for engaging packets supported on the incoming conveyor and for carrying the packets to a position free of the incoming conveyor, an outgoing conveyor supporting a plurality of compartments positioned in alignment under the transfer wheel, and means causing the gripper members to release a predetermined number of packets into each compartment of the outgoing conveyor, so as to stack the packets in the compartments of the outgoing conveyor.

BRIEF DESCRIPTION OF THE DRAWINGS

Reference will now be made to the accompanying drawings in which.

DESCRIPTION OF THE PREFERRED EMBODIMENTS

Figures 1, 10:
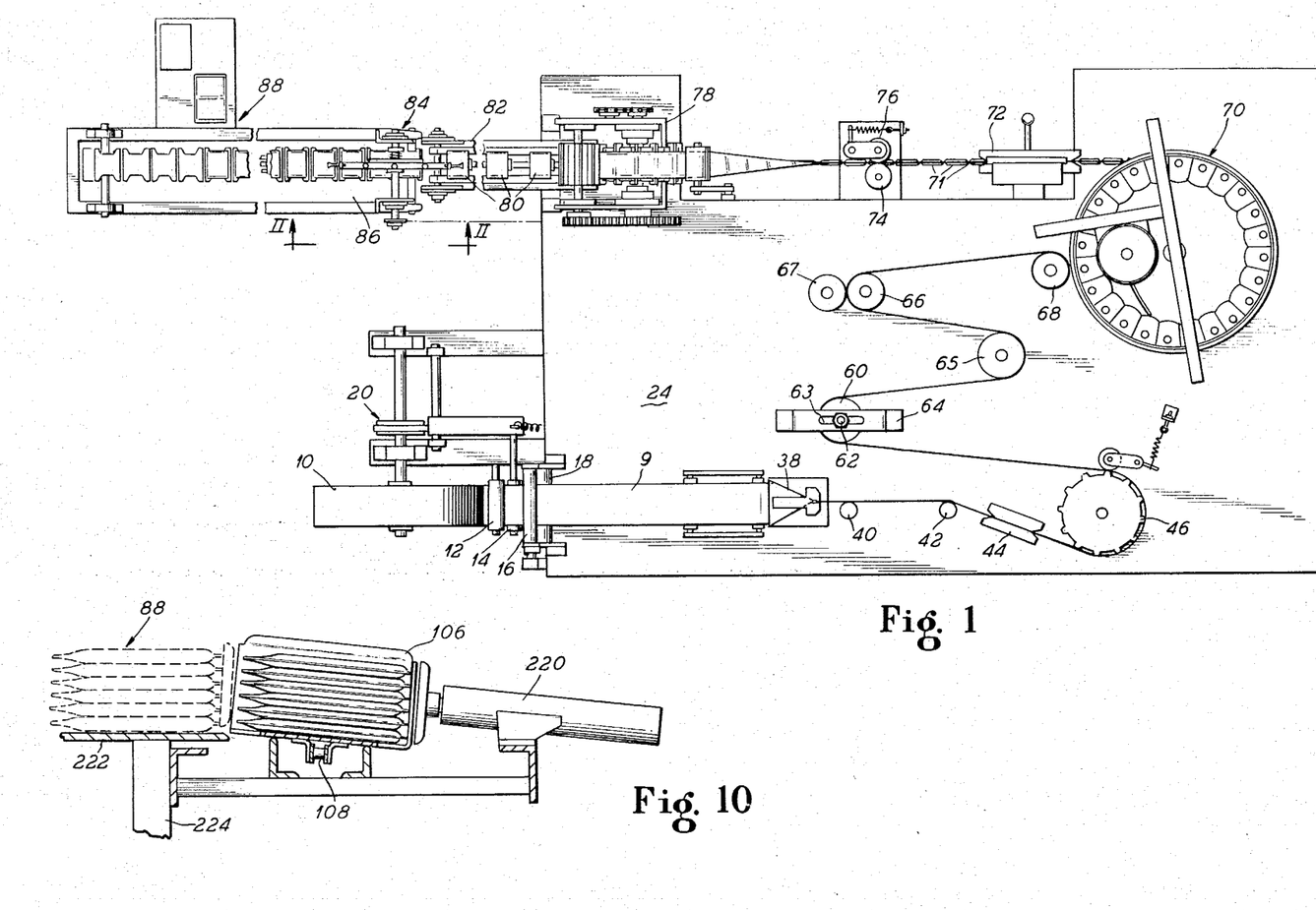
FIG. 1 is a plan view of apparatus incorporating an illustrative embodiment of the present invention.
FIG. 10 is an end elevation, partly in cross-section, of apparatus adapted for unloading compartments of the outgoing conveyor.

Referring now to the drawings, FIG. 1 illustrates a plan view of a complete packaging machine which utilizes a roll 10 of web material 9 and successively forms the web material 9 into a train of connected pouches, fills the pouches with a product, seals the open edge of the pouches to form a train of filled packets, and separates the individual packets from the train. After the packets have been separated, they are received by a transfer wheel and stacked in compartments supported on an outgoing conveyor, and finally loaded into boxes or cartons.

Some of the apparatus of FIG. 1 is well known in the art and is illustrated in FIG. 1 only to show its relationship to apparatus embodying the present invention. In particular, the apparatus for forming a train of connected pouches, having an open side, from a roll of web material is described in Cloud U.S. Pat. No. 3,505,776. As described in that patent, the roll 10 contains a supply of web material, preferably of the type coated on at least one side with a sealable material such as plastic or the like. The web 9 is unrolled from the roll 10 through a series of successive rollers 12, 14, 16 and 18, and the tension on the web is controlled by a brake unit 20. A paper plow 38 is supported by a table 24 and folds the web 9 upwardly into a V-shaped cross-section with a crease at the bottom, as described in the aforementioned Cloud U.S. Pat. No. 3,505,776. Then the web 9 passes over guide rollers 40 and 42 to a heat sealing means 44. The heat sealing means is provided for the purpose of sealing together a thin margin adjacent the bottom folded edge of the web 9 so as to maintain the web in tightly folded condition.

Following the heat sealing means 44, the web 9 passes around a segmented drum 46 which functions as a vertical sealer to seal together the sides of the folded web 9 along spaced vertical bands to form a train of pouches having an open upper side. The drum 46 is also described in the aforesaid Cloud U.S. Pat. No. 3,505,776.

The web 9 thereafter passes over a roll 60 which is mounted on a shaft 62 supported in an adjustable relation in a slot 63 provided in a bracket 64. The bracket 64 is bolted to the surface of the table 24. Adjustment of the position of the roll 60 relative to the bracket 64 permits synchronization between the operation of the drum 46 and the operations taking place at the filling station 70.

Following the roll 60 the web 9 passes over a roll 65 and then through the nip of a pair of drive rollers 66 and 67, which are driven (by means not shown) so as to pull the web 9 from the supply roll 10.

Following the drive rolls 66 and 67, the web 9 passes over an idler roller 68 and then around the periphery of a circular filling station 70. As the web 9 passes around the filling station 70, the pouches are successively opened, filled with a quantity of product such as granulated sugar or the like, and then manipulated to settle the product in the pouches. Thereafter, the web 9, now comprising a series of filled pouches 71, leaves the filling station 70 and passes through an upper sealing station 72, at which the upper edge of the pouches is sealed to form individual connected packets 80. Apparatus for making the upper seal is described in Cloud et al U.S. Pat. No. 3,344,576. Thereafter, the train of filled and sealed packets 80 passes through a second drive station incorporating a drive roller 74 and a spring biased idler roller 76. The rollers 74 and 76 bear on a side margin of the web which is maintained in a relatively planar condition.

Following the second drive station the train of packets 80 is twisted through 90° and then passed through a cutting station 78 having a plurality of cutting blades adapted to engage the vertical sealed portions formed by the drum 46, to seperate the web into a plurality of seperate packets 80. A suitable cutting station is described in Cloud U.S. Pat. No. 3,597,898. Thereafter, the individual separate packets 80 are transported by a conveyor belt 82, to the transfer station 84, at which they are transferred from the conveyor 82 to another conveyor 86. The conveyors 82 and 86 are hereinafter referred to as the incoming and outgoing conveyors. The outgoing conveyor 86 has a plurality of compartments supported on its upper surface, and a predetermined number of the packets 80 are inserted into each of the compartments of the conveyor 86 at the transfer station 84. Thereafter the conveyor 86 transports the packets to a loading station 88, at which the packets are removed from the compartments of the conveyor 86 and placed into cardboard cartons, each carton receiving the content of one compartment of the conveyor belt 86.

Figure 2:
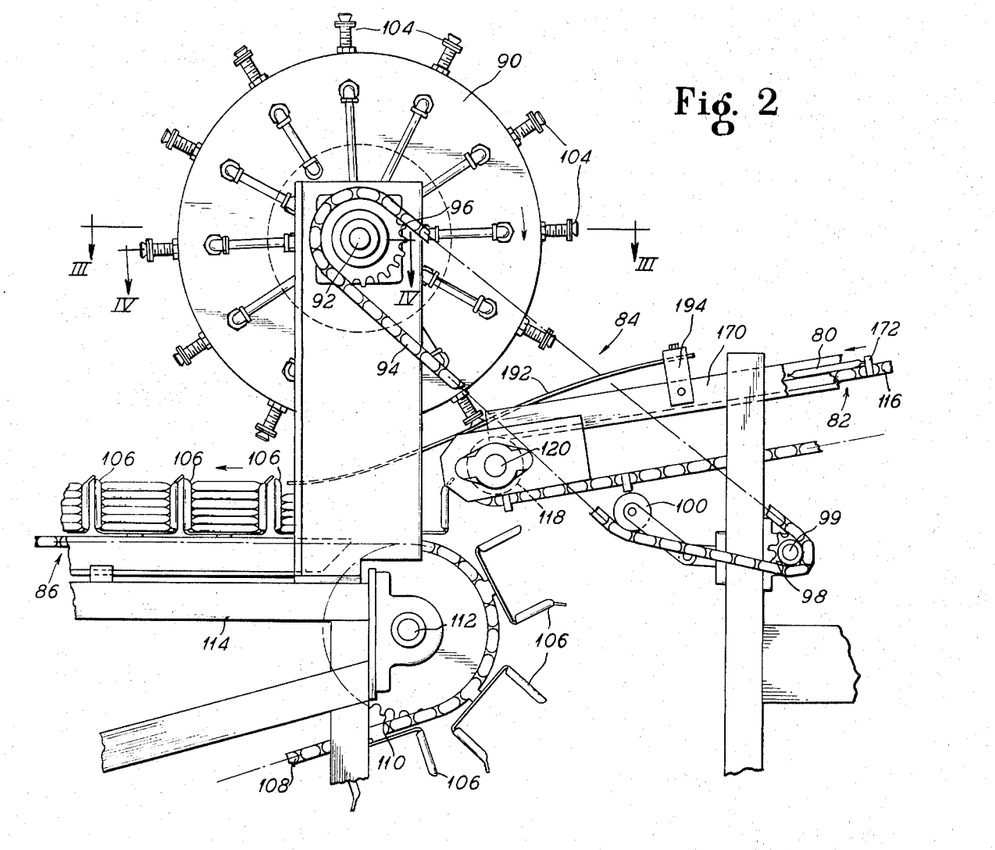
FIG. 2 is a vertical elevation of a portion of the apparatus illustrated in FIG. 1, taken through the plane II—II.

Referring now to FIG. 2, the apparatus which is located at the transfer station 84 is illustrated. A transfer wheel 90 is supported on a shaft 92 for rotation about a horizontal axis and is driven by means of a chain 94 engaging a sprocket 96 secured to the shaft 92. Another sprocket 98, mounted on a shaft 99, is in engagement with the chain 94 and serves to drive the chain thereby rotating the wheel 90. The shaft 99 is connected with the machine drive and is rotated in synchronism therewith by means not shown. An idler wheel 100 bears against the chain 94, and maintains it in a relatively taut condition.

The transfer wheel 90 has mounted thereon a plurality of grippers 104 adapted to receive individual packets 80 as they are brought to the transfer station 84 by the incoming conveyor 82. The grippers 104 are connected to a vacuum or low pressure pneumatic source and are adapted to grip the packets 80 and lift them from the conveyor 82 as the wheel 90 rotates in a clockwise direction. The grippers 104 secure the packets 80 in fixed relation to the wheel 90 until they arrive at a position directly above one of a plurality of compartments 106 carried by the outgoing conveyor 86. Then the packets 80 are released into the compartments 106 so as to form a stack or pile of packets in each of the compartments 106.

The compartments 106 are mounted on a chain 108, which is supported on a sprocket 110, mounted on a horizontal shaft 112 secured to the frame 114 of the machine, and is moved in synchronism with the machine drive. The compartments 106 are secured to individual links of the chain 108 and are carried by the chain around the sprocket 110 to the horizontal upper reach of the conveyor 86. The conveyor 86 is located directly under the wheel 90, in alignment therewith, so that as the compartments 106 move horizontally they are maintained in vertical alignment with the path travelled by the grippers 104.

The incoming conveyor 82 comprises a chain 116 which is supported for rotation about a sprocket 118 mounted on a shaft 120 secured to the frame of the machine, and is also driven in synchronism with the machine drive. The positions of the incoming and outgoing conveyors 82 and 86 are both in fixed relation to the wheel 90, which serves to transfer the packets 80 from the incoming conveyor 82 to the outgoing conveyor 86.

Figures 3, 5, 6:
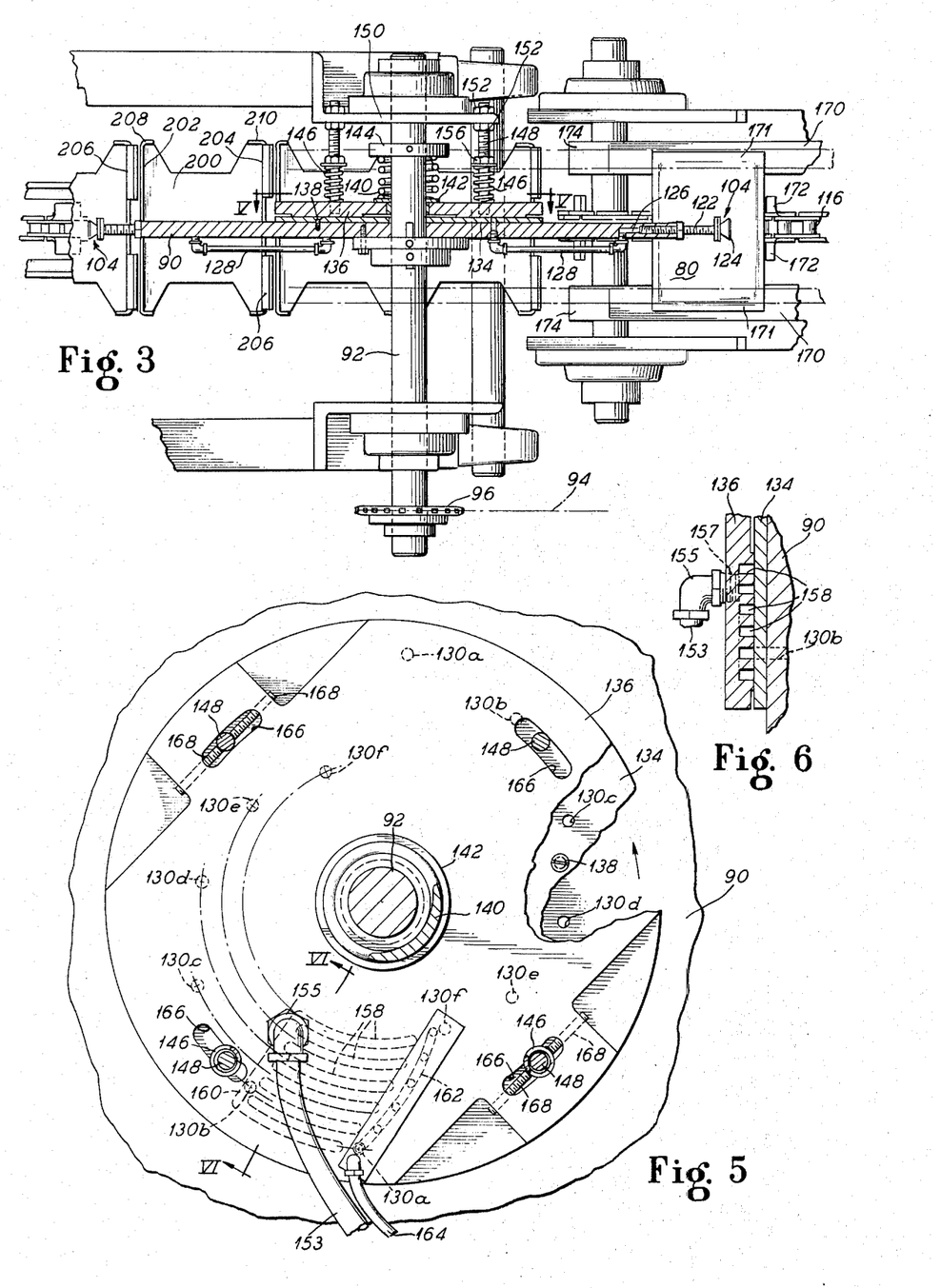
FIG. 3 is a horizontal cross-sectional view of the apparatus illustrated in FIG. 2, taken through the plane III—III.
FIG. 5 is a vertical cross-sectional view taken through a portion of the apparatus illustrated in FIG. 3 along the plane V—V.
FIG. 6 is a cross-sectional view taken through a portion of the apparatus illustrated in FIG. 5 through the plane VI—VI.
Figure 4:
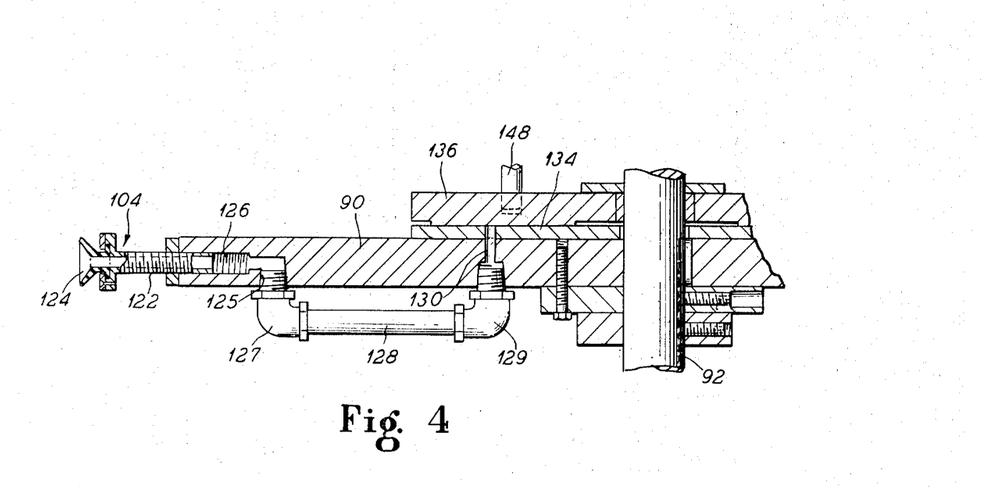
FIG. 4 is a horizontal cross-sectional view of a portion of the apparatus illustrated in FIG. 2, taken through the plane IV—IV.

As shown in FIG. 3, the wheel 90 comprises a relatively thin, round disc of material, and the grippers 104 comprise hollow tubes 122 threadably secured in bores 126 provided at spaced intervals about the periphery of the wheel 90. The tubes 122 extend radially outwardly from the bores 126, in coaxial alignment therewith. Each of the grippers 104 is provided with a flexible suction cup or the like 124 secured to the outer end of its tube 122, which cup is adapted to engage and support one of the packets 80. The interior of each tube 122 is connected to a partial vacuum source, via its bore 126, which extends radially into the wheel 90 fan enough to join with a bore 125 (FIG. 4). The bore 125 connects the inner end of the bore 126 to the outer surface of the wheel 90. An elbow 127 is connected between the bore 125 and a tube 128, which leads to another elbow 129, connected to the wheel 90 in alignment with an aperture 130, which passes through the wheel 90 and through a wear plate 134 to the surface of a bearing plate 136, which overlies the wear plate 134. The wear plate 134 is secured to the wheel 90 by means of screws 138. The bearing plate 136 is rigidly supported in relation to the frame of the machine, while the wheel 90 and the wear plate 134 rotate together with the shaft 92, the wear plate 134 sliding on the bearing plate 136.

The bearing plate 136 is urged into firm engagement against the wear plate 134 by a central spring 140, one end of which urges a washer 142 against the bearing plate 136, and the other end of the spring 140 bears against a flange 144 secured to the shaft 92.

Four additional springs 146 are also provided to urge the bearing plate 136 into firm relation with the wear plate 134. The springs 146 are supported by shafts 148 which are mounted on a frame member 150 by nuts 152. A nut 156 is provided on each shaft 148, and each spring 146 extends between the nut 156 and the bearing plate 136, urging it against the wear plate 134. By means of the central spring 140 and the additional springs 146, the force between the bearing plate and the wear plate 134 is uniformly distributed over the common surface of these two plates, and a pneumatic seal is maintained therebetween.

FIG. 5 shows a plan view of the bearing plate 136, and illustrates a tube 153 connected to an elbow 155 which communicates with a bore 157 (FIG. 6) leading to a recess provided on the side of the bearing plate 136 which faces the wear plate 134. The recess includes a plurality of slots 158. The slots 158 are all interconnected at one end by means of a slot 160, so that the space within all of the slots 158 is maintained at the same pneumatic pressure, viz., the pressure within the tube 153. The tube 153 is connected to a source of a partial vacuum, so that the space within all of the grooves 158 has a reduced pneumatic pressure.

As shown in FIG. 5, 12 separate bores 130 are provided in the wear plate 134, and each of the bores 130 is connected to a tube 128 for connection to one of the grippers 104. The 12 bores 130 are divided into two groups of six each, and in both groups, each of the bores is located at an individual radial distance from the center of the shaft 92. The bore 130a has the largest radial spacing from the center of the shaft 92, while the bore 130f has the shortest radial spacing from the center of the shaft 92. The other bores of each group, namely 130b, 130c, 130d and 130e, have individual spacings intermediate those of the bores 130a and 130f. As the wheel 90 rotates, relative to the bearing plate 136 and the wear plate 134, the bores 130a–130f are brought into alignment with individual ones of the grooves 158, just as each bore 130 approaches the bottom of the wheel 90. At this point the suction cup 124 of the gripper 104 associated with each bore is connected to the partial vacuum within the tube 153, so that the suction cup 124 is adapted to grasp and secure one of the packets 80 in position. As the wheel 90 rotates, the packet 80 is maintained in fixed position relative to the wheel 90, until it reaches a position over one of the compartments 106 supported by the outgoing conveyor 86. At this point the vacuum is released, and the packet is dropped into the compartment 106.

As shown in FIG. 5, a manifold 161 is secured to the bearing plate 156 by screws 163, and includes a groove 162 adjacent to the exterior surface of the bearing plate 136, and the interior of the groove 162 is connected to a tube 164. The groove 162 overlies apertures 165a–165f provided in the bearing plate 156. The tube 164 is connected to a pneumatic source at an elevated pressure, so that when each of the bores 130 become aligned with the groove 162, the vacuum maintained by its suction cup 124 is positively released, and the packet is blown from the suction cup 124. This assists in the quick release of a packet from the wheel 90 and its deposit in the proper compartment 106.

The shape of the groove 162 is adapted to the positions of the apertures 165a–165f, and is such as to release the partial vacuum connected with the bore 130a at an earlier radial position than that at which the partial vacuum is released from the bore 130f. The other bores 130b–130e have their partial vacuums released at intermediate radial positions between those of the bores 130a and 130f. In this manner the time of release of each packet is dependent upon which of the grippers 104 supports the packet and is controlled so that the first packet of each group of six successive packets is released relatively early in the cycle of rotation of the wheel 90, while the compartment 106 is relatively near to the incoming conveyor 82, while the sixth packet of each group is released at a later time in the cycle, to compensate for the movement of the compartment 106 away from the incoming conveyor 82 during the interim. In this manner, six packets are deposited into a single compartment 106, by timing the release of each of the six packets 80 with the movement of the conveyor. After six packets 80 are deposited into a compartment 106, the next six packets are deposited in the next following compartment 106.

The position of the bearing plate 136 is adjustable relative to the wheel 90 by means of an adjustable connection between the shafts 148 and the bearing plate 136. An arcuate aperture 166 is provided for receiving the end of each of the shafts 148, and a pair of screws 168 extend through threaded bores aligned with two of the apertures 166, located diametrically opposite each other. By rotating the screws 168, with the shafts 148 being trapped between the ends thereof, the position of the bearing plate 136 is shifted slightly relative to the wheel 90, by rotating it about an axis coaxial with the shaft 92. In this manner the position of the grooves 158 and 162 may be adjusted relative to the compartments 106, so that the packets 80 are dropped into the compartments rather than between two adjacent compartments 106.

Figure 7:
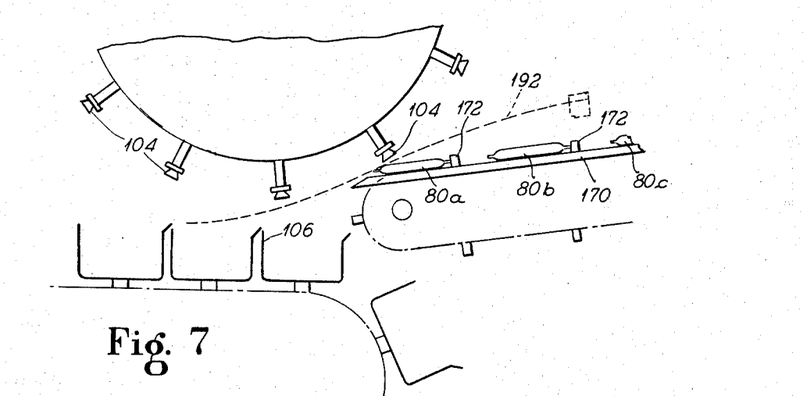
FIGS. 7–9 are diagramatic illustrations of the apparatus of the present invention at a variety of times within a single cycle of operation of the apparatus.
Figure 8:
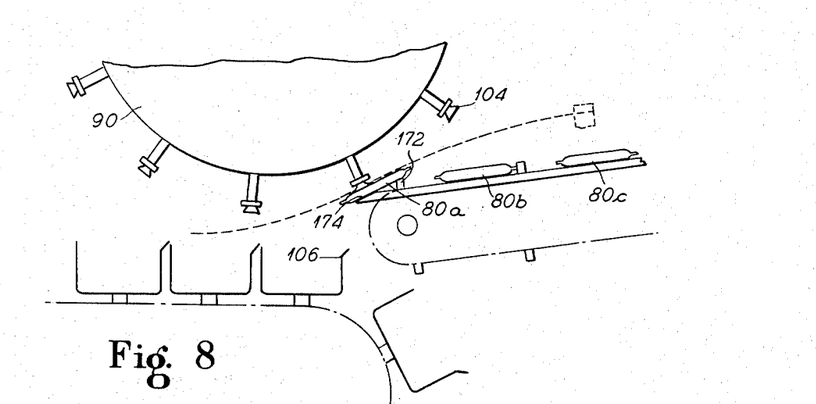
Figure 9:
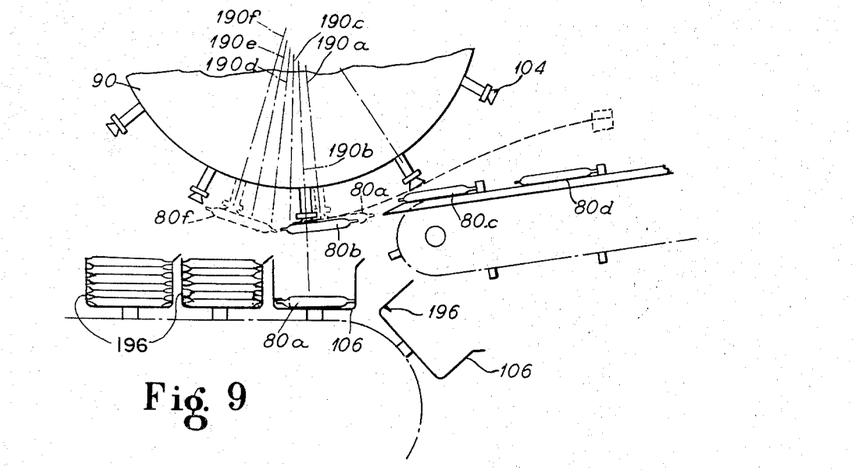

The incoming conveyor 82 is provided with a pair of side rails 170 having an L-shaped cross section, for engaging the side margins 171 of the packets 80 and for supporting the packets 80 by their side margins. A plurality of pusher members 172 are mounted in fixed relationship to links of the chain 116 for positively pushing the packets 80 as the chain 116 is moved, and the packets are slid along the horizontal portions of the side rails 170. As shown in FIGS. 7–9, the end 174 of the horizontal portions of the side rails 170 are bevelled, to permit a packet 80 to shift its attitude downwardly and forwardly at the moment it engages one of the grippers 104. FIG. 7 shows the apparatus when the first packet 80a of six sequential packets is just short of engaging a gripper 104, and has not yet reached the bevelled end 174 of the side rail 170. A moment later, the condition of the apparatus is illustrated in FIG. 8. The packet 80a has now engaged the gripper 104 and has slid forwardly and downwardly on the bevelled end 174 of the side rail 170. This assists in insuring good contact between the suction cup 124 and the packets 80, and also causes the tail of the packets 80 to be raised, relative to the forward end, so that the pusher member 172 can pass under the packet as it is carried around the sprocket 118.

It can be seen that both the incoming conveyor 82 and the outgoing conveyor 86 have moved slightly between the condition shown in FIG. 7 and that shown in FIG. 8. FIG. 9 shows the condition of the apparatus slightly later, after the first packet 80a has been dropped into a compartment, and the second packet 80b has been engaged by the following gripper 104 and moved into a position over the compartment 106. FIG. 9 shows the condition of the apparatus an instant before the second packet 80b is released by its gripper 104. The position of the packet 80b is directly over the compartment 106 into which the first packet 80a has been deposited, even though the conveyor 86 has moved forwardly since the deposition of the first packet 80a. The release of the second packet 80b is brought about when its bore 130b is aligned with the release slot 162, which occurs just when the packet 80b is brought to the position indicated in FIG. 9.

The points of release of the various packets of each group of six consecutive packets is indicated by the radial lines 190a–190f in FIG. 9, which define the angular position of the grippers 104 when they release the various packets. The packet 80a is released when its gripper 104 is aligned with the line 190a, while the packet 80f is not released until it is rotated by the wheel 90 until its gripper 104 becomes aligned with the line 190f.

Transfer of the packets 80 to the grippers 104, and release therefrom is assisted by a pair of extended leaf springs 192. One end of each of the springs 192 is connected, by a bracket 194, to the two guide rails 170, and the springs 192 extend from the brackets 194 beyond the end of the incoming conveyor 82, in the shape of an S-curve, terminating above the location of a compartment 106 when the sixth packet 80f of a group of packets is deposited therein. The shape of the springs 192 is such as to curve downwardly into a plane generally parallel with the bevelled ends 174 of the guide rails 170, so that the springs 192 assist in bringing the packets 80 into the attitude shown in FIG. 8. Thereafter, the springs are gently curved toward the horizontal, so that they lie against the upper surface of the packets 80 is a plane or tangent to a plane generally normal to the direction of movement taken by the packets as they are released from the grippers 104 and deposited in the compartments 106. The force of the springs 192 thus assists in moving the packets 80 from the grippers 104 to the compartments 106. The force of the springs is slight, but is sufficient to maintain contact with the packets 80 until just slightly after they are released from the grippers 104, to maintain the correct attitude of the packets during the free fall from the grippers 104 to the compartments 106, and to prevent them from tumbling during this time.

Each of the compartments 106 has a projection 196 projecting rearwardly from the forward wall of the compartment, at a level between the first and second packets as they are stacked in a compartment 106. The projection 196 is provided to prevent the first packet 80a from bouncing out of correct position when it is deposited into the compartment, and accomplishes this function in the following manner.

The attitude of the first packet 80a, at the moment it is released, is slightly inclined, with its leading edge being disposed below the elevation of its tailing edge. It enters a compartment 106 in substantially this attitude, so that the leading edge is the first part of the packet 80a to reach the bottom of the compartment 106. The trailing edge of the packet 80a tends to rotate clockwise about the leading edge of the packet after the latter reaches the bottom of the compartment, and as it does so, comes into engagement with the rear wall of the compartment, and slides down the rear wall, camming the leading edge forwardly along the bottom of the compartment 106. When the packet 80a reaches a position at the bottom of the compartment 106, the leading edge of the packet is then trapped under the projection 196, so that further clockwise rotation of the packet as a whole is prevented, with the result that there is substantially no bouncing of the first packet 80a.

Subsequent packets 80b–80f do not require a projection 196 to prevent bouncing, for their fall is softened by packets already in the compartment 106.

The compartments 106 are formed of sheet metal or the like with a bottom wall 200, a forward wall 202 and a rear wall 204 formed of a single piece of sheet metal by bending the walls 202 and 204 upwardly from the sides of the bottom wall 200. The walls 202 and 204 are each formed of two disconnected sections, separated by a space in the middle thereof, to facilitate removal of the packets 80 by hand. The sections of the rear wall 204 each have an upwardly and rearwardly extending flap 206, which overlies the area between adjacent compartments, and prevents a packet from being deposited between two compartments 106. The side edges of the front wall 202 are bent to form lips 208, and the side edges of the rear wall 204 are bent to form lips 210, aligned with the lips 208. The lips 208 and 210 form partial side walls of the compartments 106, but do not occupy so much of the side area of a stack of packets maintained in a compartment 106 as to prevent automatic removal of the packets by means of a plunger in an alternative embodiment of the present invention, which is described hereinafter.

The embodiment illustrated in the drawings is designed to function with a constantly moving outgoing conveyor 86. This operation is most desirable if an operator is provided for manually removing the stacks of packets from the compartments 106 and placing them in position in a carton or the like. When the outgoing conveyor 86 moves at a constant speed, an additional advantage is achieved in than less power is required for the drive and there is less wear on the parts than when the conveyor is advanced intermittently.

Figure 11:
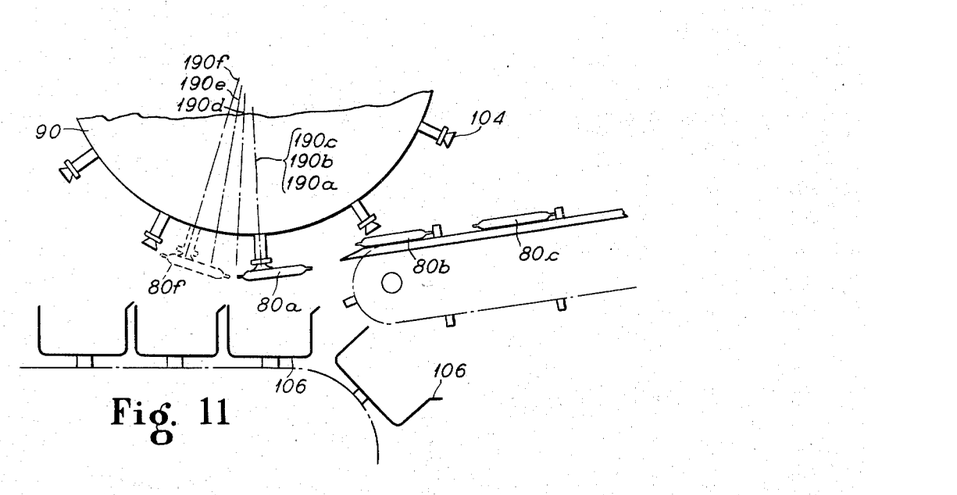
FIGS. 11 and 12 are diagramatic illustrations of alternative embodiments of the present invention.

In an alternative form of the present invention, shown in FIG. 11, the outgoing conveyor is moved intermittently. FIG. 11 is an illustration comparable to FIG. 9, in that the radial lines 190a–190f indicate the angular positions at which the several packets 80a–80f are released. As shown in FIG. 11, the first three packets 80a–80c are released at the same angular position, and the receiving compartment 106 is stationary at this time, since the conveyor 86 is at rest. Thereafter, the packets 80d, 80e and 80f are released at different angular positions of the wheel 90, to allow for the movement of the conveyor 86 during indexing to the next stationary position of the conveyor 86. The adjustment in the release points is made by changing the shape of the groove 162, so that each of the apertures 130a–130f becomes aligned with the grooves 162 at the proper position. The intermittent drive may be constructed in a conventional manner, using a geneva pinion or other known apparatus for achieving an indexing for a predetermined period during each cycle, with motion between successive indexings. The shape of the groove 162 makes it feasible to move relatively slowly from one index position to another, which requires less drive power, and minimizes wear of the parts.

When the arrangement of FIG. 11 is employed, automatic loading of the cartons is possible by means of the apparatus shown in FIG. 10. While the conveyor 86 is stationary, a plunger 220 is energized to push the packets 80a–80f from the compartment 106 onto a platform 222, and to then retract out of the path of the conveyor 86 while the conveyor remains motionless. The partial side walls or lips 208 and 210 do not hinder this operation, as the opening between them is large enough to pass the packets 80 by slighly buckling the ends of the packets. The platform 222 may be raised by means of a support 224 into a carton supported above the platform.

Figure 12:
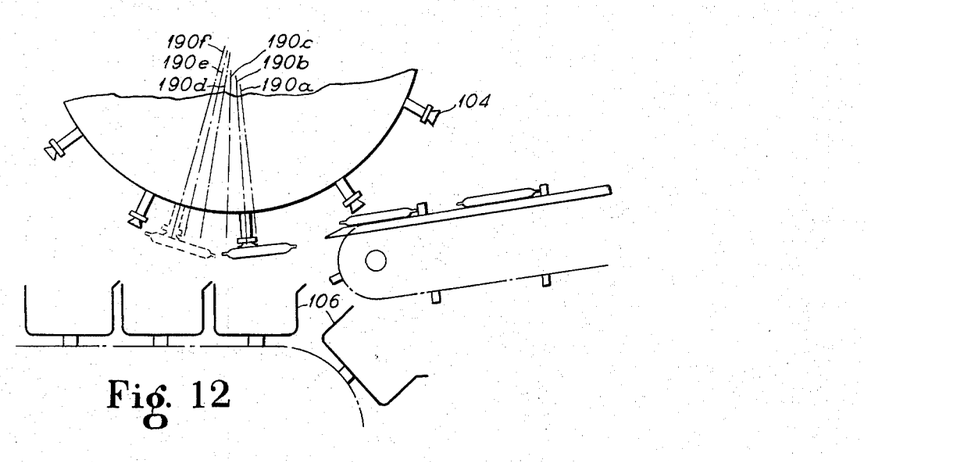

FIG. 12 illustrates a further embodiment of the present invention which the outgoing conveyor 86 is driven at a variable velocity, which represents a compromise between the embodiments illustrated in FIGS. 9 and 11. The velocity of the conveyor 86 is slowest between the time of release of a packet 80f into one compartment and the release of the first packet 80a into the next compartment. The velocity increases after the release of the packet 80a and reaches a maximum after the release of the packet 80c. Then the velocity decreases to the minimum following the release of the packet 80f. The angles at which each gripper 104 releases its packet is controlled by selecting the appropriate shape for the slot 162, with the apertures 130a–130f reaching the slot 162 at the proper position. The drive means for the outgoing conveyor 86 is conventional.

From the foregoing, it is apparent that the apparatus of the present invention is effective to automatically transfer packets from a rapidly moving incoming conveyor to a more slowly moving outgoing conveyor, with the packets stacked neatly in a stack within each compartment of the outgoing conveyor.

What is claimed is:

1. In a packaging machine for forming and filling a plurality of packets and transporting them in serial relation on a first conveyor, the combination comprising:

a transfer wheel,
    a series of grippers mounted around the periphery of said transfer wheel for gripping individual packets as they are transported by a first conveyor,
    means for causing said grippers to grip said packets as they are transported by a first conveyor,
    a constantly moving outgoing conveyor having a plurality of compartments each receiving a plurality of said packets in stacked relationship,
    means for rotating said transfer wheel for transporting said gripped packets over said outgoing conveyor, and
    release means for releasing said packets from individual grippers sequentially at different angular positions of said grippers to deposit a plurality of packets in each moving compartment of said outgoing conveyor, thereby forming stacks of said packets in each of said compartments.

2. Apparatus according to claim 1, wherein said grippers are divided into a plurality of groups, and wherein said release means causes corresponding grippers in each of said groups to release their packets at the same angular positions.

3. Apparatus according to claim 1, wherein each of said grippers comprises a suction cup supported on said wheel facing radially outwardly therefrom, and said means for causing said grippers to grip said packets including means for connecting a partial vacuum to said suction cup.

4. Apparatus according to claim 3, wherein said connecting means comprises a hollow tube connected at one end with each of said suction cups, the opposite end of each of said tubes being connected with an aperture provided in said wheel at a face thereof normal to the axis of rotation of said wheel, and valve means in sliding contact with said face for connecting said aperture to a source of a partial vacuum.

5. Apparatus according to claim 4, wherein said valve means includes a fixed bearing plate against which said wheel rotates, said bearing plate having a plurality of radially spaced arcuate grooves therein on the surface contacting said face, and means for connecting a source of a partial vacuum with said groove.

6. Apparatus according to claim 5, wherein said bearing plate has a further groove therein on the surface contacting said face, said further groove being separate from the arcuate grooves, and means for connecting a source of pneumatic pressure greater than atmospheric with said further groove, said further groove being disposed on said surface to be aligned with said apertures when said grippers are released.

7. Apparatus according to claim 1, wherein a first conveyor transports said packets in single file relationship, a first conveyor having support means for supporting said packets as they are transported, said support means supporting said packets generally in a first plane parallel to the direction of motion of a first conveyor, and including means for supporting said packets generally in a second plane inclined to said first plane as said packets are gripped by said transfer wheel.

8. Apparatus according to claim 7 wherein said support means includes a bevelled surface adjacent the end of a first conveyor.

9. Apparatus according to claim 7, wherein a first conveyor includes a pair of guide rails for supporting side margins of said packets as they are transported, said guide rails having a bevelled end portion for supporting said packets in said second plane.

10. Apparatus according to claim 1, including control means for controlling the attitude of said packets as they are released by said transfer wheel.

11. Apparatus according to claim 10, wherein said control means comprises a leaf spring adapted to bear on said packets as they are supported by said transfer wheel, for urging said packets toward said compartments.

12. Apparatus according to claim 11, including means for supporting one end of said leaf spring above a first conveyor, said leaf spring engaging said packets as they are gripped by said transfer wheel.

13. Apparatus according to claim 1, wherein each of said compartments includes a projection projecting rearwardly from the forward wall of said compartment, said projection being spaced above the bottom of said compartment to receive the leading edge of the first packet deposited in said compartment therebelow.

14. Apparatus according to claim 1, wherein each of said compartments is provided with open sides on the sides of said compartment parallel to the direction movement of said conveyor.

15. A method of processing articles transported in serial relationship on a first conveyor, comprising the steps of gripping each of said articles on said first conveyor, transporting said gripped articles through an arcuate path in a vertical plane aligned with said first conveyor, and releasing a plurality of said items sequentially at different angular positions along said path into a single stack on a constantly moving conveyor.

16. The method according to claim 15 including the step of releasing each of said articles as it reaches a point aligned vertically above one of a plurality of receiving compartments supported on a second conveyor.

17. The method according to claim 16 wherein said second conveyor is moved at a controlled speed slower than the speed of said first conveyor, and including the step of dropping said articles into a plurality of said receiving compartments in groups, so that each group of successive items transported on said first conveyor is deposited into an individual receiving compartment of said second conveyor.

18. The method according to claim 15, including the step of gripping the upper surface of each of said articles.

19. The method according to claim 18, including the step of releasing said upper surface so that said articles fall toward said preselected location.

20. The method according to claim 15, including the step of tipping said article about a horizontal axis during said gripping step.

* * * * *